(12) United States Patent
Copeland et al.

(10) Patent No.: US 6,730,876 B2
(45) Date of Patent: May 4, 2004

(54) HIGHLY DUCTILE REDUCED IMPERFECTION WELD FOR DUCTILE IRON AND METHOD FOR PRODUCING SAME

(75) Inventors: Daniel A. Copeland, Bessemer, AL (US); David J. Farr, Vance, AL (US); James E. Wren, Hoover, AL (US)

(73) Assignee: U.S. Pipe and Foundry Company, Birmingham, AL (US)

( * ) Notice: Subject to any disclaimer, the term of this patent is extended or adjusted under 35 U.S.C. 154(b) by 0 days.

(21) Appl. No.: 09/866,258

(22) Filed: May 29, 2001

(65) Prior Publication Data

US 2002/0179583 A1 Dec. 5, 2002

(51) Int. Cl.$^7$ .............................................. B23K 35/02
(52) U.S. Cl. ............................ 219/145.1; 219/137 WM
(58) Field of Search ................... 219/145.1, 137 WM, 219/137 R, 136

(56) References Cited

U.S. PATENT DOCUMENTS

| | | | |
|---|---|---|---|
| 1,589,017 A | | 6/1926 | Lincoln |
| 2,547,872 A | | 4/1951 | Kissick |
| 2,900,490 A | | 8/1959 | Petryck et al. |
| 2,995,815 A | * | 8/1961 | Dixon et al. ................. 29/498 |
| 3,253,950 A | * | 5/1966 | Wasserman et al. ........ 117/206 |
| 3,301,997 A | | 1/1967 | Semenchuk |
| 3,328,557 A | * | 6/1967 | Rogers et al. .............. 219/146 |
| 3,555,239 A | | 1/1971 | Kerth |
| 3,581,053 A | | 5/1971 | Manz |
| 3,778,588 A | | 12/1973 | Bishel |
| 3,803,381 A | | 4/1974 | Bernard et al. |
| 3,851,142 A | | 11/1974 | Bishel |
| 3,851,143 A | | 11/1974 | Bishel |
| 3,909,253 A | | 9/1975 | Asnis et al. |
| 4,087,673 A | | 5/1978 | Kiilunen |
| 4,534,793 A | | 8/1985 | Olson et al. |
| 4,624,706 A | * | 11/1986 | Badia .......................... 75/246 |
| 5,242,759 A | * | 9/1993 | Hall ............................ 428/610 |
| 5,915,743 A | | 6/1999 | Palma |
| 6,308,882 B1 | * | 10/2001 | Shuster et al. .............. 228/175 |
| 6,335,512 B1 | * | 1/2002 | Warren et al. ...... 219/137 WM |
| 6,410,165 B1 | * | 6/2002 | Warren et al. .............. 428/680 |

OTHER PUBLICATIONS

Inco Alloys International, Inc., "NI–Rod Filler Metal 99," Available from Inco Alloys International, Inc., 1401 Burris Road, Newton, North Carolina 28658 (Telephone: 704–465–0352), Obtained Jan. 23, 2001 by facsimile at (704–465–8993).

* cited by examiner

*Primary Examiner*—M. Alexandra Elve
(74) *Attorney, Agent, or Firm*—Bradley Arant Rose & White LLP (57) ABSTRACT

The art has experienced difficulty obtaining "sound" welds with high-nickel welds above the second pass. Particular problems are tension anomalies and sub-optimal interweld pass fusion at higher order passes of the weld wire, along with undesirably high heat levels transferred to the workpiece. The inventors have discovered that ductile iron-to-ductile iron welds can be reliably formed at mission-critical junctures by compensating for the brittle nature of the heat affected zone through enhancing ductility of the weld itself. The present invention provides in continuing part for a highly durable weld without soundness problems such as tension anomalies, multilayer fusion imperfections, or pinholes; and a method of forming such a weld. The weld is created using high nickel weld wire (filler metal or consumable electrode, or both) welded in a pure inert gas (or mixture of pure inert gasses and even reducing gasses). Additions of weld metal alloys, flux coring, and deoxidizing coatings are not required. The work pieces do not require pre- or post-heat treatment to minimize the effects of the HAZ. Additional inventive features are described more fully below.

42 Claims, 4 Drawing Sheets

HIGHLY DUCTILE REDUCED IMPERFECTION WELD FOR DUCTILE IRON AND METHOD FOR PRODUCING SAME

BACKGROUND OF THE INVENTION

1. Field of the Invention

This invention relates generally to welding of ductile iron work pieces for weld securement in pressure, stress, and abuse critical locations, as well as lighter duty sites. More particularly, the invention is directed toward a weld joint combining both relatively high ductility and excellent soundness.

2. Description of Related Art

Numerous welding processes are known in the art, including Metal-Inert-Gas ("MIG") welding, which employs a metal electrode or filler metal and a shielding gas to enhance weldability. Although not the oldest form of welding, MIG welding is an old art, most basically described in U.S. Pat. No. 1,589,017, issued to Lincoln, which takes specific resort to alloyed filler metals, such as nickel-steel or manganese-steel. In typical welding of structures by MIG welding, a first welding pass is made, which both liquefies the upper surface of the base metal of the workpieces being welded, and deposits a portion of a consumable electrode (a "weld wire") at the intersection, or "root" of the workpieces. The liquefied base metal and deposited weld wire form a weld puddle when in the molten state, which solidifies into the weld body itself, to this point the single solidified pass is the entire weld body. Because a single pass of this welding procedure may not provide the desired holding power of a weld for the particular purposes chosen, artisans frequently build up the weld with multiple overlapping passes.

As each subsequent weld pass builds on the previously laid weld body, a portion of the area of the weld body deposited by the immediately previous weld pass is similarly liquefied, and brought into molten state amalgam with the newly deposited weld wire. By this procedure, a weld body is built up in depth from the root by a series of passes, with lower order (e.g., earlier welded) passes being overlaid and interfused with higher order (later welded) passes until the weld exhibits a depth and breadth determined to be sufficient for the characteristics of the weld required. Under certain conditions the variously ordered passes can be visually identified with the aided or even the naked eye in a cross-sectional segment of the weld body. Whether visually identifiable or not, the resultant weld body possesses multiple solidified passes, areas attributable to lower ordered and higher ordered passes, in succession. Frequently, the precise composition of each order pass will differ from the next higher and the next lower pass because of different weld wire selection used for the respective passes, or, even where the weld wire is not altered, because of dilution effects occurring from lower order pass to higher order pass.

Welding ductile iron work pieces for securement to other ductile iron work pieces by the MIG and other methods poses such difficulties that the fabrication of pipes and structures by such ductile iron-to-ductile iron welding is relatively rare. Spot and repair welding of ductile iron structures does occur of necessity in the field, but in the past the process has been problematic enough to discourage use of the ductile-to-ductile welding for purposes of securing joints or plates where failure of the weld would amount to catastrophic failure of the work piece (e.g., at the intersection of perpendicular pipe lengths).

Welds securing an in-line radial connection (i.e., a "T" intersection) between pipes may be subjected to sudden impacts or high bending moments, which are unpredictable due to the environments in which the pipes are laid and to the unanticipated installation events that may from time to time occur. Under such conditions, ajuncture created by a brittle weld will tend to fail, while a resilient weld will accommodate such forces without cracking. The difficulty of obtaining a resilient ductile iron to ductile iron weld is exacerbated by the fact that the heat produced during the welding process tends to create an area around thejoint known as a "heat affected zone" (a "HAZ"), in which the ductility of the ductile iron is adversely affected by the heat. In general, the HAZ exhibits an increased brittleness. The inventors note that because of the brittle nature of the HAZ, the welded juncture in the prior art tends to fail even where the weld metal deposit itself does not fail, with the result that cracking or breaching may be observed in the HAZ surrounding the weld. Because of the difficulties posed by the HAZ, the art has focused on solving the ductile weld difficulties in two manners. First, artisans typically attempt to reduce the size of the HAZ. This means introducing the least amount of heat possible to the joint, which necessitates a focus on smaller welds that exhibit a firm bond at low order passes. The second known solution entails extending the weld a great distance from the root/throat, to either distribute the HAZ over a greater area or to move the HAZ to a region of lower stress.

Where welding is performed on ductile iron, weld wires, which may be filler metal or consumable electrode, frequently include an alloy of nickel. Typical nickel alloy weld wires include 44% or 55% nickel, although other alloys may be available in varying percentages. Higher purity nickel weld wire is understood in the art to be primarily useful only for single, or at most double, pass welding situations; typically this high purity nickel is used only in spot repair. It is known in the art that when a weld necessitates building up by multiple passes, a higher order pass using a weld wire with high nickel purity tends to exhibit undesirable cosmetic characteristics such as tension anomalies (those in the art occasionally refer to such tension anomalies variously as "inclusions," "porosity," "pitting," and other terms indicating a perceptible lowering of smoothness or purity of the weld body, particularly at the surface, but also in cross-sectional view). Because of difficulties in achieving a "sound" weld (a weld that substantially avoids or reduces tension anomalies), higher order passes are believed by the art to require either an alloy containing less than 86% Nickel, or a flux core or coated weld wire that (1) dilutes the nickel content in the weld puddle and (2) may produce a slag or other weld puddle surfactant. This focus by the art is exemplified by U.S. Pat. No. 3,328,557, issued to Rogers, which addresses the difficulties and proposes a tubular nickel electrode having a flux core; by U.S. Pat. No. 3,301,997, issued to Semenchuk, and by U.S. Pat. No. 2,900,490, issued to Petryck, which each teach that when using a "high nickel" content wire base, the weld puddle must be diluted with non-nickel additives or alloys.

Due in part to issues such as those discussed above, the art considers a sound and cosmetically clean higher order pass of undiluted nickel weld wire to be beyond reach. Suppliers of high purity nickel weld wire have informed the inventors that it is prohibitively difficult to produce a sound and cosmetically clean weld at weld passes higher than second order passes. Present product literature regarding high nickel content welding wire suggests use of such wire for only first order (single pass) welds or second order (dual pass) welds that will be machined, as is exemplified by Inco Alloys International's product sheet for NI-ROD Filler Metal 99. As described in the claims and illustrated in the summary and detailed description below, the inventors disclose a weld having both of these characteristics of soundness and ductility at higher order passes.

BRIEF SUMMARY OF THE INVENTION

The art has experienced difficulty obtaining "sound" welds with high-nickel welds above the second pass. Particular problems are tension anomalies and sub-optimal interweld pass fusion at higher order passes of the weld wire, along with undesirably high heat levels transferred to the workpiece. The inventors have discovered that ductile iron-to-ductile iron welds can be reliably formed at mission-critical junctures by compensating for the brittle nature of the heat affected zone through enhancing ductility of the weld itself. The present invention provides in continuing part for a highly durable weld without soundness problems such as tension anomalies, multilayer fusion imperfections, or pinholes; and a method of forming such a weld. The weld is created using high nickel weld wire (filler metal or consumable electrode, or both) welded in a pure inert gas (or mixture of pure inert gasses and even reducing gasses). Additions of weld metal alloys, flux coring, and deoxidizing coatings are not required. The work pieces do not require pre- or post-heat treatment to minimize the effects of the HAZ. Additional inventive features are described more fully below.

OBJECTS OF THE INVENTION

The following stated objects of the invention are alternative and exemplary objects only, and no one or any should be read as required for the practice of the invention, or as an exhaustive listing of objects accomplished.

As suggested by the foregoing discussion, an exemplary and non-exclusive alternative object of this invention is to provide a method of producing a sound weld between work pieces, at least one of which is ductile iron.

A further exemplary and non-exclusive alternative object is to provide a reliable and ductile weld between work pieces, at least one of which is ductile iron, the weld being substantially pure nickel at those areas of the weld deposited by higher order passes than the second order pass.

A still further exemplary and non-exclusive alternative object of the invention is to provide a method of providing a ductile weld that substantially eliminates the need for physically removing slag and scale from the weld bead between passes.

A still further exemplary and non-exclusive alternative object of the invention is to provide a method of welding that exhibits enhanced weldability at higher order passes.

The above objects and advantages are neither exhaustive nor individually or collectively critical to the spirit and practice of the invention. Other or alternative objects and advantages of the present invention will become apparent to those skilled in the art from the following description of the invention.

DETAILED DESCRIPTION OF THE INVENTION

The following is a detailed exemplary description of the invention, in a number of its various aspects. Those skilled in the art will understand that the specificity provided herein is intended to illustrate the inventor's exemplary embodiment in such various aspects, and is not to be interpreted as limiting the scope of the invention.

The current invention provides for the use of "99% nickel" or other high nickel purity weld wire, while enhancing the impact and bending resilience of the resulting weld. In one aspect of the invention, the invention resides in compensating for the brittleness of a HAZ by increasing the ductility of the weld—including those areas of the weld deposited by passes greater than second order—rather than "strengthening" the weld or concentrating on reducing the HAZ. In another aspect of the invention, the inventors include a weld and a method of making that weld, having multiple (greater than two) passes in which the purity of nickel generally increases from the root 12 of the weld outward along the midline of the weld. By way of example, the invention has application to welded ductile iron pipe outlet fabrications for both pressure and non-pressure applications.

Though not to be construed as limiting the invention, the inventors prepare workpiece(s) 1 by sampling for purposes of Charpy impact testing. The invention has been applied to ductile iron having a room temperature Charpy impact test value of 8.5 ft.-lbs, though variant Charpy impact rated ductile iron workpieces may also be used if the particular application for the welded joint so demands.

Figure 1:
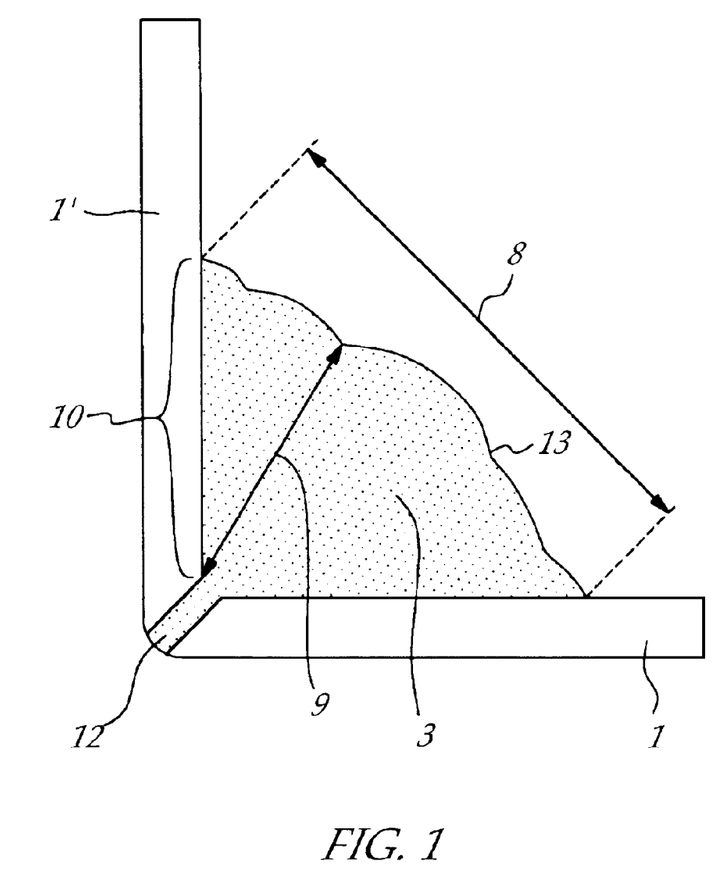
FIG. 1 shows a diagram of a cross section of a typical multiple-pass weld, presented for clarity of discussion of the various areas and lengths of a weld.
Figure 4:
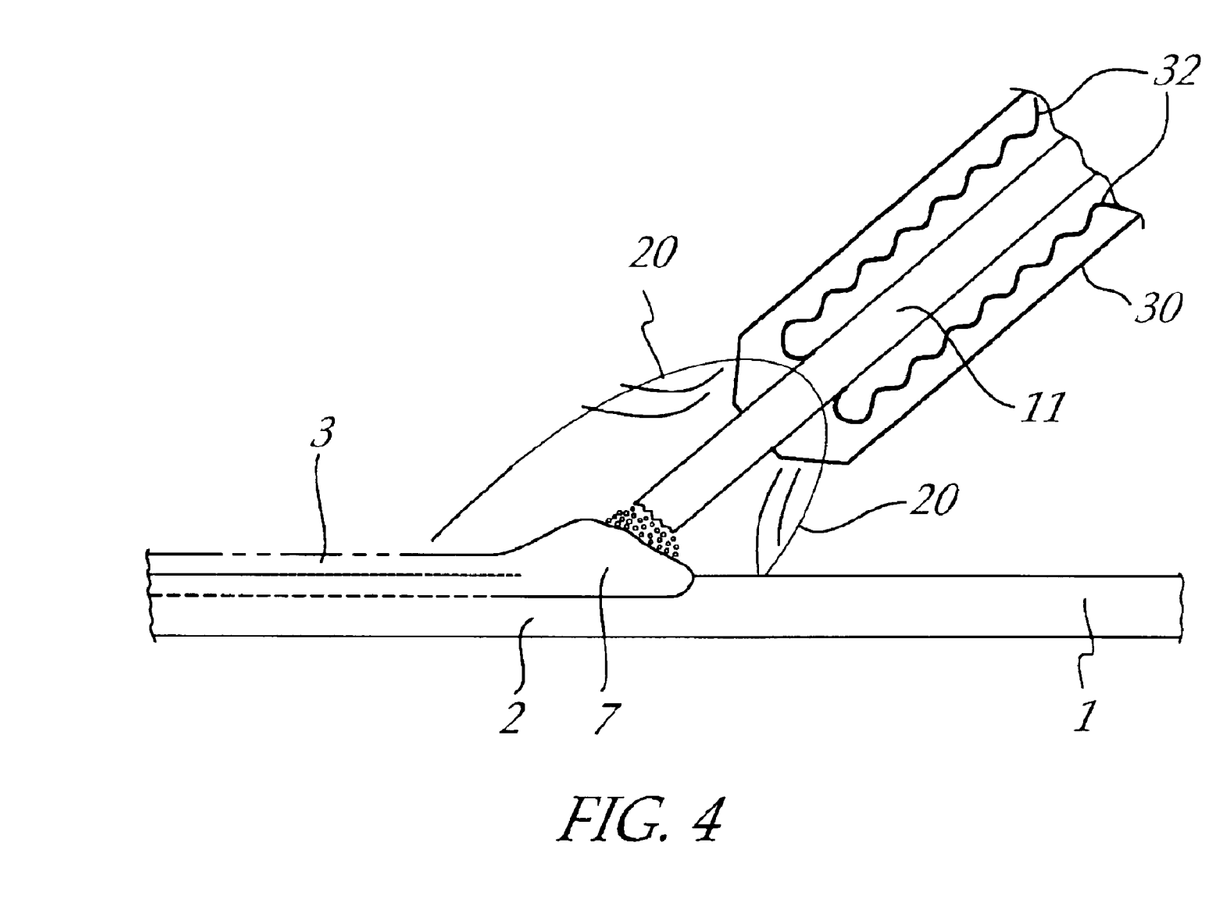
FIG. 4 shows the process of welding pursuant to the current invention.

Turning now to the drawings, FIG. 1 shows the cross section of a typical cooled fillet weld body 3 at a 90 degree juncture of two work pieces 1 (shown here as first workpiece 1' and second workpiece 1"), for purposes of clarity of discussion of dimensions and lengths of the weld. Those in the art will understand that first workpiece 1' and second workpiece 1" may be different portions of the same item, so long as a welding operation is being performed at a juncture (or "root") of the portions, or is otherwise being carried out at a cleavage or break in the item. Without limiting the meanings that the terms may have to those skilled in the art, weld 3 begins (both for purposes of discussion and in actual creation of the weld) at the root and continues generally outward. As shown in FIG. 4, a welding torch 30 having as its consumable electrode a weld wire 11 of high purity nickel is employed to render by known processes a portion of the workpiece(s) 1 molten, and to deposit and amalgamate with the molten portion of workpiece(s) 1 a quantity of high purity nickel from weld wire 11. The result is a molten amalgam in the form of weld puddle 7 of metal from workpiece 1 and weld wire 11. As weld puddle 7 solidifies, it becomes a pass within weld body 3.

Without deviating from the spirit of the invention, a welder may first lay a "butter pass" welded deposit of weld wire 11 along the area of workpiece(s) 1 to be welded, to prepare the workpiece(s) 1 for more efficient creation of weld puddle 7. Without wishing to be limited to theory, the butter pass is believed to create at the surface of workpiece (s) 1 an amalgam of weld wire 11 and workpiece 1 that during welding for securement enters a molten state for welding and fusion more easily and at relatively lower temperatures than would be required in the absence of the butter pass; furthermore, the butter pass is believed conventionally to minimize the HAZ by allowing for increased speed of laying a weld pass. In the spirit of the invention and throughout this description and the claims, such a "butter pass" is not considered a pre-treatment of the workpiece; rather, it is considered a first order pass.

The invention does not require pre-heating, post-heating, chemical treatment, or other antimartensitizing treatment. Unlike prior art solutions, the workpiece(s) 1 may be at substantially room temperature or slightly higher for effective practicing of the process and creation of the weld of the present invention. As will be understood in light of the traditional pre-heating procedures that create substantially elevated and uncomfortable heat levels for the welder, raising or maintaining the temperature of the workpiece(s) 1 to room temperature or slightly higher is not considered a "preheat treatment." Those in the art will appreciate that the workpiece(s) 1 may be pre-heated without deviating from the spirit and scope of the invention. Nonetheless, to avoid variant expansion difficulties of a cold work piece and to rid the work area of moisture, the inventors typically in practice raise the temperature of the workpiece(s) 1 to approximately 100 (+/−10) degrees Fahrenheit, which may be achieved by slight heating of the workpiece(s) 1 prior to welding. While not affecting (by alteration of or prevention of alteration of) the metallurgical or chemical structure of the workpiece(s) 1 (and therefore not qualifying as a pre-heat treatment), this heat level maintains the environment in a comfortable and safe condition for the welder, avoids the expense and difficulty of elevating large workpieces 1 to high temperatures, avoids the difficulties of moving large high-temperature workpieces 1, and accounts for the need to avoid varying expansion rates in welding and cooling.

Figure 3:
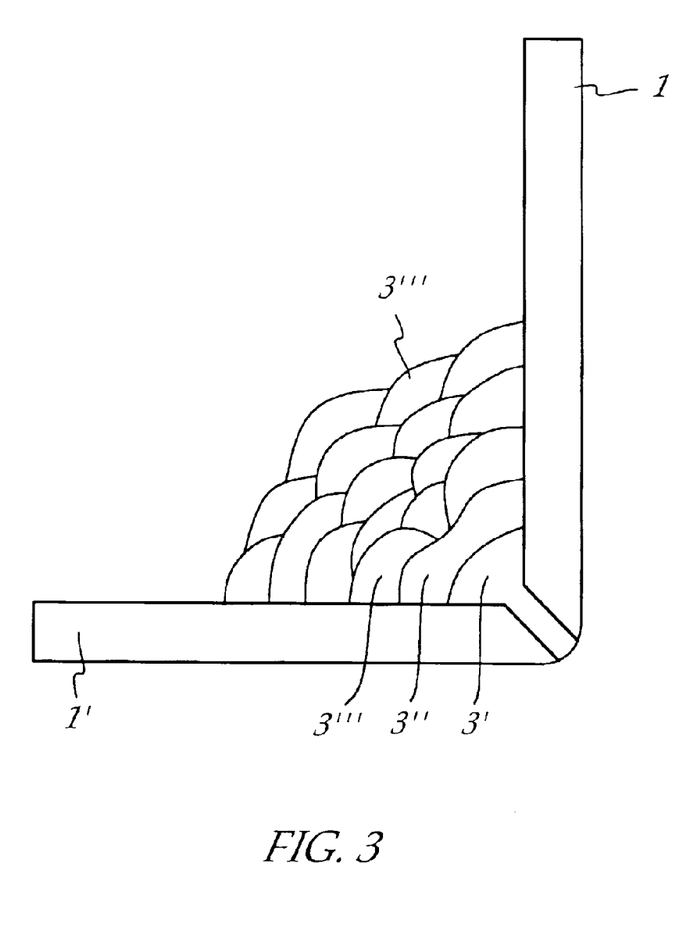
FIG. 3 portrays a cross sectional view of a weld under the current invention, specifically showing a general order of welding and depositing of layers of the resulting weld.

Looking to FIG. 3, weld body 3 is built up in multiple passes, owing to the fact that the weld puddle typically cannot be made large enough in a single pass to satisfy the structural requirements of the resulting weld juncture. The first pass, or root pass 3', is welded into place by causing a portion of the base metal of workpiece(s) 1 and weld wire 11 to become molten in the weld puddle 7 of the operation, which solidifies as discussed above. The root pass 3' may be welded in a continuous welding operation along the length of the root, or it may be welded in a discontinuous fashion by welding a segment of the root, skipping at least once to another section of the root, and returning to fill in gaps. This discontinuous skip-welding method is employed to reduce the amount of heat absorbed by workpiece(s) 1 at any given time and location.

To build up the weld body 3, a second order pass 3" is welded atop first order pass(es) 3', causing a portion of first order pass(es) 3' to enter a molten state and form an amalgamation with the additional weld wire 11 deposited in the welding of second order pass 3". It will be understood by those in the art that a second pass may amalgamate portions of both base metal and a first order pass 3' along with additional weld wire. A pass causing such an amalgamation will be considered for purposes of this description a second order pass if a meaningful part (greater than or equal to approximately 25% of the material contributed by non-weld wire) is from a first order pass (likewise, a pass remains a first order pass if a meaningful part of the amalgam is contributed by base metal). Of course, once a portion of a lower order pass has been amalgamated into a higher order pass, that entire portion of the weld is considered to be in the higher order pass. Additional building up of the weld with higher order passes occurs by similar subsequent welding operations that introduce into the weld puddle 7 of such operation both additional weld wire 11 and a portion of the lower order passes immediately below the currently welding pass. For example, a higher order pass 3''', specifically a third order pass, will be any portion of the weld body 3 attributable to a welding operation that causes in meaningful part a portion of second order pass(es) 3" to enter a molten state and form an amalgamation with additional weld wire 11. For purposes of the invention all passes that are third order passes or higher are considered higher order passes 3'''. A pass that builds directly upon multiple passes of different orders (or the workpiece 1 and at least one pass) will be of an order one greater than the highest order pass upon which it builds in meaningful part. Each of these variously ordered passes may typically be visually identified in a cross-section of the resulting weld. Chemical or spectrographic techniques allow such determination with a high degree of accuracy, but are not required.

In the practice of an exemplary mode of welding within the scope of the current invention, a welder selects a weld wire 11 having a substantially pure nickel content, such as 86% pure nickel or higher. In particular, without limiting the scope of the invention, the inventors may employ a nickel purity of at least 90% for enhanced consistency and reproducibility of weld failure tests under the present invention, and most particularly 96% pure nickel or higher, at which enhanced yield strengths seem to exhibit greater values over the range of conditions potentially presented to the weld. These figures of nickel purity include the entirety of the weld wire 11 and all coatings, such that a flux-coated weld wire 11 having a theoretical 100% nickel core, and having a flux coating equal to 20% of the flux-coated weld wire 11 by weight would be considered an 80% pure nickel weld wire 11. In practicing the invention, the welder welds by gas metal arc welding process, using the selected weld wire 11 of substantially pure nickel as the consumable electrode. In the prior art, attempts to obtain a sound and substantially tension anomaly-free weld body 3 at higher order weld passes 3''' tend to fail when the nickel purity remains above 86% in the weld wire prior to operation of the invention. At such stage in the prior art, cosmetically undesirable tension anomaly issues occur. Under the present invention, a weld face may exhibit an average of four or fewer tension anomalies per square inch that are visible to the naked eye. Depending on the characteristics of the base metal, two to three or fewer tension anomalies on average per square inch may be visible to the naked eye in most circumstances under the invention. In fact, using ductile base metal of characteristics used by the inventors (produced by U.S. Pipe and Foundry, Bessemer, Ala.), an average of one or fewer tension anomalies per square inch have been observed in the practice of the invention.

The welder under the process of the current invention employs a spray transfer technique, at least at higher order passes 3'''. A gas shield 20 of substantially pure argon blankets the weld puddle 7 at higher order passes 3'''. The precise lower range of argon purity is not known but, purity of the argon used by the inventors is 99.6%. The inventors believe that argon must be 98% pure in the practice of the invention, based on an understanding of the oxidizing tendency of pure nickel. Argon may be substituted with helium or other inert gas in appropriate circumstances, provided that the purity of the inert gas and inert gas components maintains the gas as a whole within oxidation preventive parameters. In some cases it is believed that reducing gasses may be present without harming performance. Because of the high demands placed on the torch 30 when using a spray transfer technique in the presence of argon gas shield 20, the welder uses operable liquid cooling or air cooling elements 41 to prevent excessive wear on the torch 30. Because the particular mechanics of cooling elements 41 may be varied within the function of the present invention, the elements 41 are not described in detail. A particular, though not essential, embodiment of the practice of the present invention employs a pulse MIG welding machine to effect the spray transfer while avoiding excessive heat transfer to the work piece.

Without limiting the application of the invention, the inventors believe that the mechanism of action causing tension anomaly issues is attributable to dilution affects and the ease of oxidation of substantially pure nickel. The high purity nickel deposited in the creation of a first order pass 3' is necessarily diluted by the quantity of base metal of the workpiece 1 that goes into solution in the weld puddle 7. The weld operation forming a second order pass dilutes the high nickel weld wire 11 with a portion of the already-diluted weld pass 3', which provides only a portion of the dilutive effect on the additional high purity nickel deposited in the operation. In most cases, the dilution effect, though weakened, remains strong enough to prevent the resulting amalgam in the weld puddle 7 from oxidizing rapidly before it solidifies into second order weld pass 3". In like manner, higher order weld pass(es) 3''' enjoy only the still lower dilution ability of the second order (now double-diluted) weld pass. At this point, the nickel in the weld puddle 7 created by the weld operation remains pure enough even after dilution by the remaining base metal that oxidation rapidly occurs, leading to tension anomaly issues.

Figure 2:
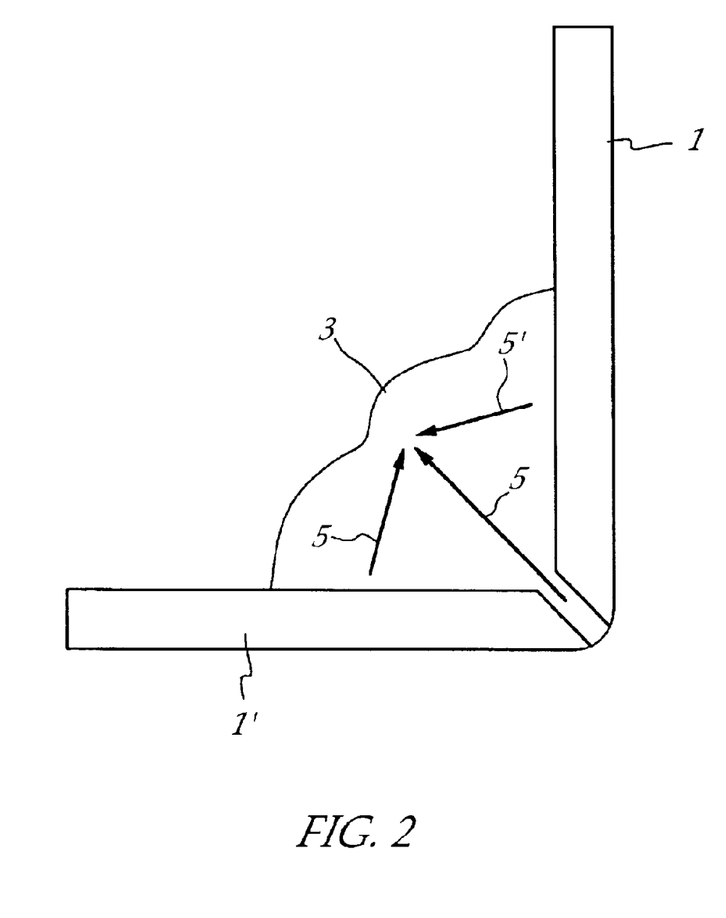
FIG. 2 depicts a gradient diagram of a cross section of a weld under the current invention, demonstrating the direction of the general gradient of nickel purity.

The resultant inventive weld of the current invention is diagrammatically exemplified in FIG. 2, which shows a weld body 3 being a substantially sound and tension anomaly-free, and having a gradient of nickel purity 5 increasing as the order of passes increases. The higher order passes 3''' of the weld body 3 under the present invention exhibit an average nickel purity of greater than about 83.5% pure nickel and display a substantial lack of tension anomaly issues visible to the naked eye. As the order of pass increases, the purity of the pass tends to increase, such that higher order passes may have a nickel purity of 90% or greater. The minimum nickel purity in a higher order pass 3''' will depend in part upon the characteristics of the work piece(s) 1, which may contain varying levels of readily-alloying materials. In some cases, the lowest higher order pass 3''' (e.g., a third order pass) may exhibit a nickel purity of 90% or greater. Although some variation is permitted within the invention, the purity of nickel in the weld body 3 generally increases as the point of reference moves away from the workpieces 1, such that the purity increases as the reference point moves outward from the root along the throat as shown by gradient line 5. Of course, mere face coatings, cosmetic layers, and other overlay passes can be ignored for purposes of assessing the gradient of nickel purity, as these would not remove a weld or process from the spirit or scope of the invention. As a general rule, purity also tends to increase as the reference point moves away from workpiece(s) 1 along gradient lines 5" and 5".

It should be understood that because of the manner of welding and depositing in passes, the gradient 5 (or 5' or 5") is unlikely to be linear if graphed; rather, the nickel purity will show a stepwise rise. It is possible that at certain points a gradient may show an increase along certain orientations of gradient line 5, attributable to possible overlapping of weld passes above higher order passes 3''' that draw in meaningful part for the constituents of their weld puddle 7 from passes of an order not immediately below their own. This might occur if a particularly wide pass is welded atop a second order pass 3", which wide pass happens to flow over or slightly over-weld a fourth or fifth order pass. The result may be a gradient graph that maintains an overall general increase in nickel purity from root 12 towards the face 13, while exhibiting potential spikes along the graph. A weld possessing such a gradient graph would remain within the invention. In contrast to the present invention, the current art reduces purity of these higher order passes 3''' by employing less than 70% pure nickel weld wire after second order passes, which causes the resulting weld to have the lower ductility of the lower nickel purity passes, regardless of the purity of the lower order passes.

Finally, another inventive aspect of the article of manufacture of the present invention is a weld body 3 having greater ductility than the ductility of the workpiece 1. This would be characterized by a weld body 3 having a substantially lower yield stress than the ultimate tensile stress exhibited by the HAZ of workpiece 1.

In practice, by way of further example rather than limitation, the inventors employ the above described invention by using INCO Filler Metal 99, having specification AWS A5.15 Eni-CI, 0.045" diameter as a weld wire for fabrication of welded ductile iron pipe outlets. In the practice of the invention, the inventors employ a pure argon shielding gas, having an argon purity of 99.6% or higher. Welding is accomplished in accordance with the recommendations ANSI/AWS D11.2, Guide for Welding Iron Castings. The welding procedure employed for manufacturing ductile iron pipe welded outlet fabrications is the pulse GMAW process operated in "spray transfer" mode. The workpieces are prepared by cutting openings and fit-ups using plasma method cutting or other appropriate technique. The cut face is generally checked for visible cracks or metallurgical anomalies, and is intended to be free of burrs, protrusions, and cracks. Oil, grease, and other surface contaminants, if any, may be removed by using permissible solvent cleaning procedures before grinding to remove any rust, annealing oxide, or laminations. Such final cleaning events are typically performed immediately prior to welding.

The joint is then fitted up with an outlet pipe that mates to a parent pipe. The saddle fit-up between the parent pipe and the outlet pipe typically is sized to allow no more than a ⅛ inch gap at any point of the joint. The opening in the parent pipe is sized to avoid any reduction of the projected diameter of the outlet by radially inward extension of the parent pipe into the inner diameter of the outlet pipe. Likewise, the opening of the parent pipe may typically be a minimum of 0.5 inch less than the outside of the outlet. It is occasionally practiced to deposit two or more tack welds on the perimeter of the outlet prior to welding. Tack welds may be removed prior to depositing a full fillet weld in the tacked areas, but the tack weld may be allowed to remain if it is visibly sound and has no slag or oxide present.

In this exemplary procedure, the pipe and outlet weldment areas are heated uniformly to a pre-weld temperature of 100 degrees Fahrenheit (+/−10 degrees) to remove moisture at base material and to promote consistent welds. Higher preheats that may encourage or facilitate carbide formation may be typically avoided. A butter pass is applied to both parent pipe and outlet pipe prior to fillet welding, extending approximately ½ inch beyond the toe of the fillet weld on the parent and outlet pipes. The butter pass is sized to be continuous under the fillet weld to within ¼ inch of the root of the fillet weld. The fillet weld is built up using multiple welding passes of increasing order. In practice, the inventors may cause the fillet weld leg, non-inclusive of the butter pass, to be three times the specified thickness of the outlet pipe, or greater. In a particular variation of this procedure, portions of each pass of the fillet weld may be laid down in continuous runs of typically no more than 6 inches in length to effect a skip welding technique. Following this variation, each run would be alternated on the opposite side of the outlet, gradually filling in all unwelded areas around the circumference of the outlet. Typically under this variation, a full root pass would be constructed prior to initiating the fillet weld. The finished fillet weld would ideally exhibit full throat thickness, having a slightly convexed as opposed to concaved cross-sectional profile, though failure to exhibit such full throat thickness will not remove a weld or the process of producing the weld from the scope of the invention.

CONCLUDING REMARKS

The foregoing represents certain exemplary embodiments of the invention selected to teach the principles and practice of the invention generally to those in the art such that they may use their standard skill in the art to make these embodiments or variations based on industry skill, while remaining within the scope and practice of the invention, as well as the teaching of this disclosure. The inventor stresses that the invention has numerous particular embodiments, the scope of which shall not be restricted further than the claims as allowed.

What is claimed is:

1. A weld joint comprising a first workpiece, a second workpiece, and a weld body joining said first workpiece and said second workpiece, which weld body comprises lag-free weld puddle of substantially pure nickel that yields a weld joint substantially free of porosity.

2. A weld joint as in claim 1, wherein said area attributable to a higher order pass comprises greater than or equal to approximately 83.5% nickel.

3. A weld joint as in claim 1, wherein said area attributable to a higher order pass comprises greater than or equal to approximately 90% nickel.

4. A weld joint comprising a first workpiece, a second workpiece, and a weld body joining said first workpiece and said second workpiece, said weld body comprising an area attributable to a higher order pass that comprises substantially pure nickel, the surface of which is substantially free of slag and slag residuals, and which surface exhibits an average of four or fewer pits visible to a naked eye per square inch.

5. A weld joint as in claim 4, wherein said area attributable to a higher order pass comprises greater than or equal to approximately 83.5% nickel.

6. A weld joint as in claim 4, wherein said area attributable to a higher order pass comprises greater than or equal to approximately 90% nickel.

7. A weld joint as in claim 4, wherein said weld body has an average of three or fewer pits visible to a naked eye per square inch.

8. A weld joint as in claim 7, wherein said area attributable to a higher order pass comprises greater than or equal to approximately 83.5% nickel.

9. A weld joint as in claim 7, wherein said area attributable to a higher order pass comprises greater than or equal to approximately 90% nickel.

10. A weld joint as in claim 4, wherein said weld body has an average of two or fewer pits visible to a naked eye per square inch.

11. A weld joint as in claim 10, wherein said area attributable to a higher order pass comprises greater than or equal to approximately 83.5% nickel.

12. A weld joint as in claim 10, wherein said area attributable to a higher order pass comprises greater than or equal to approximately 90% nickel.

13. A weld joint as in claim 4, wherein said weld body has an average of one or fewer pits visible to a naked eye per square inch.

14. A weld joint as in claim 13, wherein said area attributable to a higher order pass comprises greater than or equal to approximately 83.5% nickel.

15. A weld joint as in claim 13, wherein said area attributable to a higher order pass comprises greater than or equal to approximately 90% nickel.

16. A weld comprising a higher order pass, and having a gradient of nickel purity as measured along a throat of said weld that generally increases between a root of said weld and a point within said higher order pass, said higher order pass being weldable with another weld pass without removal of slag.

17. A weld comprising a second order pass and a plurality of higher order passes, said plurality of higher order passes comprising at least a third order pass and a fourth order pass, the weld having a gradient of nickel purity that generally increases from a second order pass through said third order pass and said fourth order pass, and being substantially free of porosity and of slag.

18. A weld comprising a higher order pass, and having a gradient of nickel purity as measured along a throat of said weld that generally increases as the distance from a root of said weld increases, a face of said weld having an average of four or fewer pits visible to a naked eye per square inch, said face being substantially free of slag.

19. A weld as in claim 18, wherein the face of said weld has an average of three or fewer pits visible to a naked eye per square inch.

20. A weld as in claim 18, wherein the face of said weld has an average of two or fewer pits visible to a naked eye per square inch.

21. A weld as in claim 18, wherein the face of said weld has an average of one or fewer pits visible to a naked eye per square inch.

22. A slag-free weld comprising a plurality of passes, which passes comprise a second order pass and at least one higher order pass; wherein
   a. a plurality of said passes generally increase in nickel purity as the order number increases; and wherein further
   b. the last of which passes to increase in nickel purity has an average of four or fewer pits visible to a naked eye per square inch; and wherein further
   c. no pass comprises any flux inclusions.

23. A weld as in claim 22, wherein the last of which second and higher order pass zones to increase in nickel purity has an average of three or fewer pits visible to a naked eye per square inch.

24. A weld as in claim 22, wherein the last of which second and higher order pass zones to increase in nickel purity has an average of two or fewer pits visible to a naked eye per square inch.

25. A weld as in claim 22, wherein the last of which second and higher order pass zones to increase in nickel purity has an average of one or fewer pits visible to a naked eye per square inch.

26. A method of producing a highly ductile weld, comprising the steps of:

a. selecting a weld wire comprising substantially pure nickel b. in the absence of flux, fusing a weld bead of said weld wire onto a workpiece, whereby a first weld pass of weld bead is welded c. fusing to said first weld pass at least one weld pass of said weld wire, whereby an intermediary pass of weld bead is welded d. in the presence of a substantially pure inert gas, fusing to said intermediary pass at least one weld pass of said weld wire in a substantially undiluted condition.

27. A method of producing a highly ductile weld as in claim 26, wherein said substantially pure inert gas comprises an inert gas in combination with reducing gasses.

28. A method of producing a highly ductile weld as in claim 26, wherein said substantially pure inert gas comprises argon gas.

29. A method of producing a highly ductile weld as in claim 26, wherein said substantially pure inert gas comprises argon gas in combination with reducing gasses.

30. The method of creating a welded ductile iron joint according to claim 26, further comprising the step of abstaining from pre-heating, post-heating, or chemical anti-martensitizing treatment of a heat affected zone.

31. The method of creating a welded ductile iron joint according to claim 26, wherein at least one of steps b, c, and d is accomplished by a skip welding technique.

32. The method of creating a welded ductile iron joint according to claim 26, wherein at least one of steps b, c, and d is accomplished using a liquid cooled welding torch.

33. The method of creating a welded ductile iron joint according to claim 26, wherein at least one of steps b, c, and d is accomplished using a pulse MIG welder.

34. The method of creating a welded ductile iron joint according to claim 26, wherein said fusing in at least one of steps b, c, and d occurs by means of spray transfer welding.

35. A method of producing a highly ductile weld, comprising the steps of:

a. selecting a weld wire comprising substantially pure nickel;

b. fusing by spray transfer a weld bead of said weld wire onto a workpiece using a liquid cooled welding torch operated in a skip welding technique, whereby a first weld pass of weld bead is welded;

c. fusing by spray transfer to said first weld pass at least one weld pass of said weld wire using a liquid cooled welding torch operated in a skip welding technique, whereby an intermediary pass of weld bead is welded;

d. in the presence of a substantially pure inert gas, using a liquid cooled welding torch operated in a skip welding technique to fuse, in the absence of flux, by spray transfer to said intermediary pass at least one weld pass of said weld wire in a substantially undiluted condition.

36. The method of creating a welded ductile iron joint according to claim 35, wherein at least one of steps b, c, and d is accomplished using a pulse MIG welder.

37. The method of creating a welded ductile iron joint according to claim 35, further comprising the step of abstaining from pre-heating, post-heating, or chemical anti-martensitizing treatment of a heat affected zone.

38. A method of producing a highly ductile weld as in claim 35, wherein said substantially pure inert gas comprises an inert gas in combination with reducing gasses.

39. A method of producing a highly ductile weld as in claim 35, wherein said substantially pure inert gas comprises argon gas.

40. A method of producing a highly ductile weld as in claim 35, wherein said substantially pure inert gas comprises argon gas in combination with a reducing gas.

41. A method of creating a welded ductile iron joint having a yield strength of less than a tensile strength of a heat affected zone in said ductile iron joint, comprising compensating for a brittleness of said heat affected zone by creating a highly ductile weld bead in the absence of flux using a filler metal or a consumable electrode of a high ductility material consisting essentially of nickel.

42. The method of creating a welded ductile iron joint according to claim 41, wherein said heat affected zone is not subjected to any of pre-heating, post-heating, or chemical antimartensitizing treatment.

* * * * *